Sept. 20, 1971    J. BION    3,606,495
PRESSURE CONTROL VALVE
Filed June 17, 1969    2 Sheets-Sheet 1

Inventor
JACQUES BION
By Bacon & Thomas
Attorneys

Sept. 20, 1971 J. BION 3,606,495
PRESSURE CONTROL VALVE
Filed June 17, 1969 2 Sheets-Sheet 2

Inventor
JACQUES BION
By Bacon & Thomas
Attorneys

United States Patent Office
3,606,495
Patented Sept. 20, 1971

3,606,495
PRESSURE FLUID CONTROL VALVE
Jacques Bion, Aulnay-sous-Bois, France, assignor to Societe Anonyme dite: Compagnie des Freins et Signaux Westinghouse
Filed June 17, 1969, Ser. No. 834,038
Claims priority, application France, June 17, 1968, 155,225
Int. Cl. B60t *13/36*
U.S. Cl. 303—54                                6 Claims

ABSTRACT OF THE DISCLOSURE

A pressure fluid control valve arranged to be connected in mechanical brake linkage of a tractor to control a supply of pressure fluid to a pressure fluid operated trailer brake has a flap member opened by brake forces in the linkage via a piston, the pressure fluid passed by the valve tending to close the flap member, and force transmitting levers fulcrumed on a body portion of the device to transmit forces between the body portion, the piston and an actuator rod.

BACKGROUND OF THE INVENTION

The present invention relates to a pressure fluid control valve for example for a tractor adapted to pull a trailer having a pressure fluid operated brake.

The weight of trailers tends to increase whereas that of tractors has a tendency to decrease, and this places greater and greater requirements on the brakes of the trailers. It has been found that in these circumstances mechanical inertia brakes on trailers are unsatisfactory. In circumstances of rough use, such for instance as those existing in agriculture, mechanical inertia brakes become inefficient very quickly. In difficult driving conditions the shocks and compression forces exerted on the tractor/trailer coupling due to inertia braking constitute great dangers for the tractor, and numerous accidents have been caused in this way.

Previous suggestions for improved braking systems have provided pressure-fluid operated trailer brakes and a brake servo valve in a mechanical brake linkage of a tractor brake so that the brake forces in the linkage when the tractor brake is operated open the servo valve, in opposition to the force of one or more valve springs, to admit pressure fluid such as air to the trailer brake, at the same time as the operation of the brakes of the tractor. Conventionally, tractors are provided with two brake pedals, one for each rear wheel, so that the rear wheels can be selectively braked to assist in manoeuvering. The known brake servo valve is provided in the mechanical linkage from one pedal and consequently one or more compensating springs are employed in the linkage from the other pedal, so that the variations in the lengths of the linkages of the two pedals are equal for equal forces on the two pedals.

Although these known devices provide anticipatory braking of the trailer in advance of braking of the tractor, the use of a plurality of valve springs does not provide a reliable device, this being due to relaxation of the stiffness of the springs, after repeated use, Moreover, it is necessary to provide various intermediate members and substantial pedal travel, which further complicates the construction of the device.

Also, such known devices often have to be "tailor-made" for particular tractor/trailer combinations and cannot be easily modified for other combinations.

It is a non-limitative object of the present invention to provide a pressure fluid control valve which may be less subject to the above-mentioned disadvantages.

SUMMARY OF THE INVENTION

Thus in one aspect the invention provides a pressure fluid control valve comprising a body portion and an actuator, the body portion having a flap member interposed between an inlet end of pressurized fluid and an outlet end to be provided with pressure fluid, the body portion and actuator being relatively movable under the action of a control force acting on said actuator, the control valve being such that the pressure of fluid passed thereby is a function of the control force acting on the said actuator, means to utilize said pressure to oppose said relative movement and force transmitting means interposed between a piston and a rod of the actuator.

In another aspect the invention provides a pressure fluid control valve adapted to be connected in mechanical linkage of a tractor brake, the valve comprising a body portion and an actuator rod, the body portion having a flap member interposed between an inlet end and an outlet end adapted to be connected to control a pressure fluid trailer brake, the body portion and actuator rod being relatively movable under the action of a braking force in said linkage, a piston being disposed between the actuator rod and the flap member to open the flap member in response to the relative movement, the control valve being such that the pressure of fluid passed thereby is a function of the control force acting on the said actuator, means to apply said pressure to the piston to oppose said relative movement, and force transmitting means arranged for movement about a fulcrum and co-operating with the piston, the body portion and the actuator rod.

The force transmitting means may co-operate with the actuator rod via a connecting member which contacts the force transmitting means a selected distance from the fulcrum and which is detachably connected to the actuator rod to permit interchangeability with similar connecting members, whereby the said distance be adjusted.

In one embodiment of the invention, the body portion, the actuator rod and the piston are coaxially arranged, the force transmitting means comprising a plurality of levers each respectively pivotally mounted upon a respective fulcrum on the body portion and extending radially inwardly to co-operate with the actuator rod and the piston.

There may be provided two said levers, the connecting member being a U-shaped saddle member each of whose ends is supported on a respective lever at said selected distance from the fulcrum thereof.

In another embodiment of the invention, the body portion, the actuator rod and the piston are coaxially arranged, the force transmitting means comprising a resilient annular disc having a number of radially extending slits to define strips, a radially outer part of the disc being supported by a fulcrum edge of the body portion, a radially inner part of the disc co-operating with the piston.

The connecting member may comprise an annular plate.

The control valve may comprise a flap member, the actuator rod passing through the flap member, the piston and the connecting member.

There may be provided a duct which connects the outlet end of the control valve to a low pressure outlet when the control valve is closed, the duct being closed when the control valve is opened.

The duct may include a bore in the flap member through which the actuator rod passes.

In a yet further aspect, the invention provides a tractor provided with a source of pressure fluid and a brake control device as set forth above.

DESCRIPTION OF A PREFERRED EMBODIMENT

Figure 1:
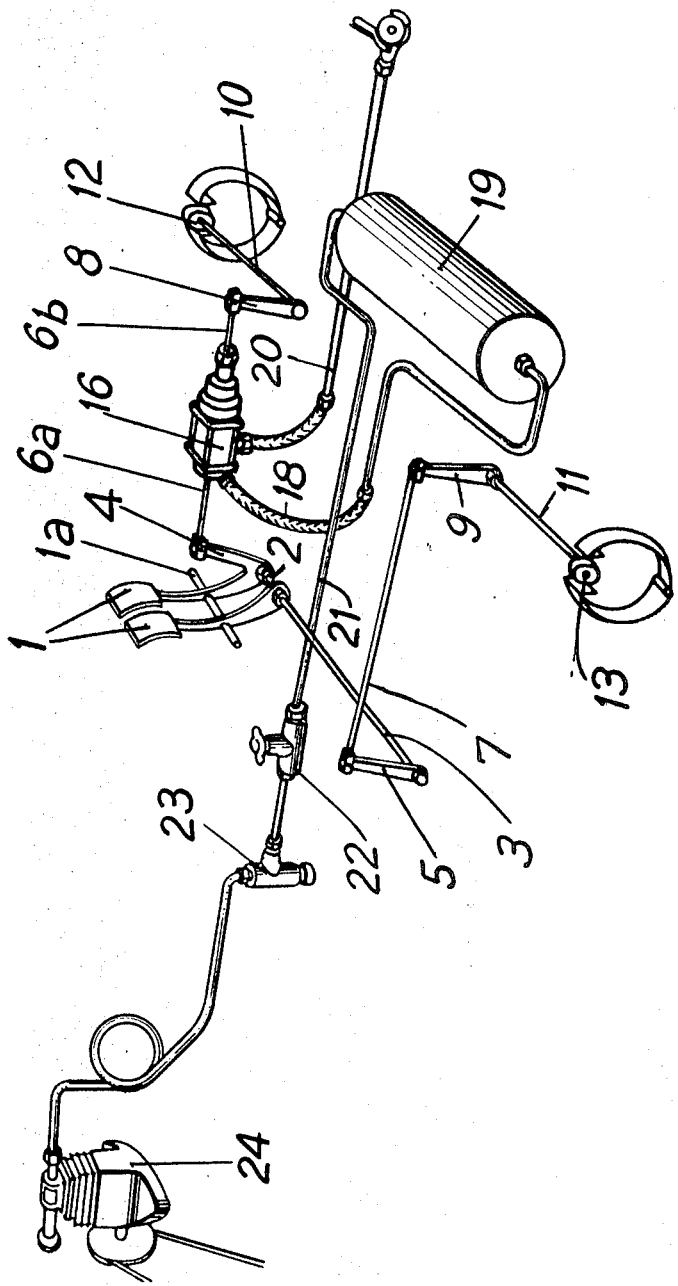
FIG. 1 shows a mechanical brake of a tractor and a brake servo device according to the invention.

Referring to FIG. 1, a tractor brake comprises double braking pedals 1, as is usual for agricultural tractors. A member 1a bolts the two pedals to each other and is freed solely while agricultural work is being carried out, so as to be able to assist the control of the tractor by the individual braking of the rear wheels. The double braking pedals are connected to the brake cams 12 and 13 of the rear wheel brakes via mechanical linkage comprising shafts 2 and 3, levers 4 and 5, traction rods 6a, 6b and 7, two further levers 8 and 9, and two shafts 10 and 11.

In the traction rod 6a, 6b, there is disposed a brake control valve 16 for braking the trailer. The control valve 16 is connected by means of a conduit 18 to a reservoir 19 of pressure fluid (compressed air) and by means of a conduit 20 to the braking installation of the trailer. The reservoir 19 is connected by a conduit 21 to a non-return valve 22, to a safety valve 23 and to an air compressor 24.

Figure 2:
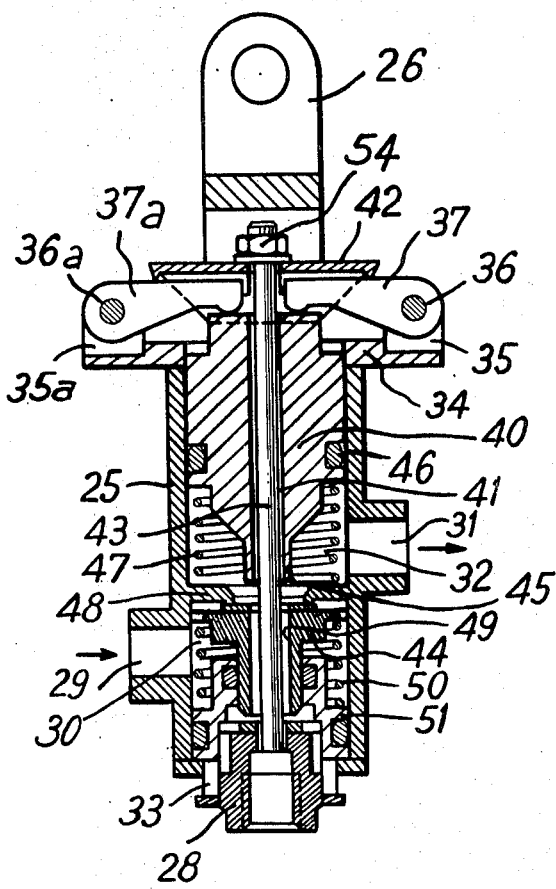
FIG. 2 is a section through a brake servo device of the invention.

The control valve 16 for braking the trailer (FIG. 2) has a body portion 25, and is provided on one of the front walls thereof with a frame 26, which is connected to the rod 6b, while on the other front wall there is provided a guide 28 which is connected to the rod 6a. The brake valve comprises an inlet connection 29 which connects a chamber 30 of the pressure fluid control valve to the air supply 19. An outlet connection 31 connects a chamber 32 of the control valve to the conduit 20.

The control valve comprises a flap member 44 having a central bore 49. In its at rest or closed position, the flap member 44 is urged upwardly by a compression spring 50 so as to make sealing contact with a radially extending apertured wall 48 between the chambers 30 and 32. A duct, constituted by the central bore 49 of the flap member 44 and passages 33, connects the outlet end of the control valve (i.e. the chamber 32) to atmosphere when the control valve is closed.

Between the frame 26 and the body portion 25, there is a plate 34 provided at each end with a lug 35, 35a. Each lug 35, 35a bears a fulcrum 36, 36a on each of which is pivoted one end of a force transmitting part constituted by two levers 37, 37a. The other end of each lever 37, 37a is supported on the end of a piston 40 provided with a central bore 41. Above the arms of the levers 37, 37a there is disposed a connecting part which may be constituted by a saddle member 42 in the shape of an inverted U, the ends of which are supported on the said lever arms a selected distance from the respective fulcra 36, 36a. This saddle member 42 is provided with a central hole in which an actuator rod 43 is retained by a nut or head 54.

The actuator rod 43 passes through the bore 41 in the piston 40 and through the bore 49 in the flap member 44, and is fixed at its other end to the guide 28.

The piston 40 slides in the chamber 32 and has an end 45 of smaller diameter than that of the chamber 32, the said end being arranged to co-operate with the flap member 44. The piston 40 comprises furthermore an annular O-ring seal 46. In the at rest or closed position of the control valve, a compression spring 47, one end of which is supported on the wall 48 between the chamber 32 and the chamber 30, keeps the piston 40 spaced from the flap member 44 and in contact with the levers 37, 37a.

When a brake force is applied via the braking pedal 1 to the traction rod 6a, this rod 6a pulls in turn the guide 28, and thus moves the actuator rod 43 relative to the body portion 25. The saddle member 42, connected to the actuator rod 43, transmits the movement to the levers 37, 37a which pivot and in turn act on the piston 40 against the action of the compression spring 47. The end 45 of the piston 40 abuts the flap member 44 to close communication between the chamber 32 and the bore 49. When the braking force is sufficient, the flap member 44 lifts from its seat against the action of the spring 50, and the pressure fluid is passed from the reservoir 19 via the inlet connection 29 and the chamber 30 into the chamber 32, and thence by the outlet connection 31 to the braking member, not shown, of the trailer brake.

The pressure of the fluid in the chamber 32, which fluid has passed through the control valve, acts upon the piston 40, urging it upwardly opposing the relative movement of the actuator rod 43 and the body portion 25 thus tending to close the control valve. The springs 47 and 50 also tend to close the control valve. The pressure force on the piston 40, and the forces in the springs 47, 50 are transmitted via the levers 37, 37a and the fulcra 36, 36a, the plate 34 and the frame 26 to the traction rod 6b, thus adding to the braking force therein. An equal increase in the force in the rod 6a of course must be supplied by increasing the force on the brake pedal 1, to maintain the equilibrium of the apparatus.

The pressure of fluid in the chamber 32 is thus a function of the braking force acting on the actuator rod 43, and consequently owing to the reaction pressure of the fluid in the chamber 32 on the piston 40, there is substantial proportionality between the braking force and the pressure of fluid in the chamber 32.

When the force on the brake pedal exceeds a certain value, the end 45 of the piston 40 pushes the flap member 44 into contact with the ring 51 which abuts the body portion 25 to transmit therethrough a part of the force exerted on the rod 6a.

Thus, the brake control valve, although not provided with springs transmitting all of the brake force, nevertheless permits modulation of the pressure of fluid supplied to the trailer brake by control of the force exerted on the brake pedal. A simple modification of the dimensions of the saddle member 42 enables the brake servo valve to be adapted for use in a wide range of tractor/trailer combinations without necessitating any changes other than that of the saddle member 42; this is because the relationship between the travel of the piston 40 and the travel of the actuator rod 43 will be larger or smaller according o the choice of the selected distance between the ends of the saddle member 42 and the fulcra 36, 36a. The nut 44 permits easy interchangeability of similar saddle members 42 so that the selected distance may be adjusted.

Figure 3:
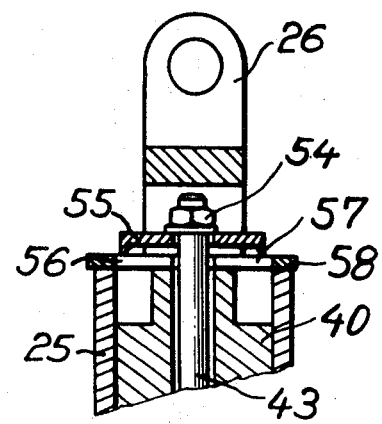
FIG. 3 is a partial sectional view of the upper part of a modification of FIG. 2.

Referring to FIG. 3 in a modification, the connecting member instead of being in the shape of a saddle member, may be constituted by an annular plate 55. Similarly, the levers 37, 37a are replaced by an annular resilent disc 56, having radial slits 57 extending from one of its edges. As illustrated, the slits extend from the radially inner edge of the disc to define strips which are integral with the solid outer part 58 of the disc 56. The outer part 58 of the disc is supported by a fulcrum edge of the valve body 25 and the inner part of the disc 56 co-operates with the piston 40.

It will be appreciated that the annular plate 55 is as easily interchangeable as the saddle member 42.

When the control valve is used with a mechanical linkage for brakes which are provided with a compression actuator, the same valve may be used with a pushing rod acting on the saddle member 63. The frame 26 and the body portion 25 may be fixed or may be free of movement as described and the fluid pressure control valve may be employed on other fields as braking without changing the scope of the invention.

I claim:

1. A pressure fluid control valve, comprising a body portion and an actuating member, the body portion including a flap member interposed between an inlet end for pressurized fluid and an outlet end to be provided with pressure fluid, the body portion and actuating member being relatively movable under the action of a control force acting on said actuating member, a piston responsive to the relative movement, and being disposed between the actuating member and the flap member to open the said flap member, and deliver a fluid pressure to the outlet end, means to apply said pressure to the piston to oppose said relative movement, and force transmitting means comprising a plurality of levers respectively pivotally mounted upon a respective fulcrum on the body portion, the levers extending radially inwardly to cooperate with the piston, and a connecting member via which the said levers cooperates with the actuating member, the connecting member contacting the levers at a selected distance from the fulcrum.

2. A pressure fluid control valve as claimed in claim 1, wherein the actuating member is a rod detachably connected to the connecting member and thus permitting interchangeability with similar connecting member to adjust the selected distance from the connecting member to the fulcrum and wherein the said rod passes successively through said connecting member, the flap member and the piston.

3. A pressure fluid control valve as claimed in claim 1, wherein there are two said levers, the connecting member being a U-shaped saddle member having two ends, each of which is supported on a respective lever at said selected distance from the fulcrum thereof.

4. A pressure fluid control valve as claimed in claim 1 wherein the body portion, the actuating member and the piston are coaxially arranged, the force transmitting means comprising a resilient annular disc having a number of radial slits extending from its radially inner edge to define strips, a fulcrum edge of the body portion supporting a radially outer part of the disc, and a radially inner part of the disc cooperating with the piston.

5. A pressure fluid control valve as claimed in claim 4 wherein the connecting member comprises an annular plate.

6. A pressure fluid control valve, comprising a body portion and an actuating member, the body portion including a flap member interposed between an inlet end for pressurized fluid and an outlet end to be provided with pressure fluid, the body portion and actuating member being relatively movable under the action of a control force acting on said actuating member, a piston responsive to the relative movement, and being disposed between the actuating member and the flap member to open the said flap member, and delivered a fluid pressure to the outlet end, means to apply said pressure to the piston to oppose said relative movement, and force transmitting means comprising a resilient annular disc having a number of radial slits extending from its radially inner edge to define strips, a fulcrum edge of the body portion supporting the outer part of the strips, and a radially inner part of the strips cooperating with the piston, and a connecting member via which the said levers cooperates with the actuating member, the connecting member contacting the levers at a selected distance from the fulcrum.

References Cited
UNITED STATES PATENTS 3,463,557    8/1969    Alfieri _____ 303—56X MILTON BUCHLER, Primary Examiner J. J. McLAUGHLIN, Assistant Examiner U.S. Cl. X.R.
137—627.5; 188—3; 251—229; 303—7, 56